Nov. 10, 1931.  W. L. McFERREN  1,831,024

WHEEL, RIM, AND TIRE LOCK

Filed Dec. 18, 1929

INVENTOR,
W. L. McFerren;
BY
F. E. Maynard
ATTORNEY

Patented Nov. 10, 1931

1,831,024

UNITED STATES PATENT OFFICE

WILLARD L. McFERREN, OF SAUGUS, CALIFORNIA

WHEEL, RIM, AND TIRE LOCK

Application filed December 18, 1929. Serial No. 414,983.

The invention relates to road-vehicle wheels and especially to means for locking the wheel to its axle, and for locking the rim and its tire to he wheel felloe.

The invention has for an object to prevent the theft or other unlicensed removal of the tire from its rim, and the rim from the felloe, and, also, to prevent the removal of the wheel from its axle.

An object is to provide a key-controlled mechanism for locking the wheel with its axle and the rim and its tire with the wheel felloe.

More specifically an object is to provide a locking mechanism which is automatically set, or made effective, by application of the wheel hub cap, and which is automatically locked as it becomes effective, and which cannot be unlocked without the requisite key.

A further object is to provide a simple, practical, reliable and durable wheel and rim lock, and one that may be incorporated readily in wheel and axle apparatus.

The invention consists in certain advancements in this art as set forth in the ensuing disclosure and having, with the above, additional objects and advantages, and whose construction, combination and details of means, and the manner of operation will be made manifest in the ensuing description of the herewith illustrative apparatus; it being understood that modifications, variations and adaptations may be resorted to within the scope, principle and spirit of the invention as it is more directly claimed hereinafter.

Figures 1, 2:
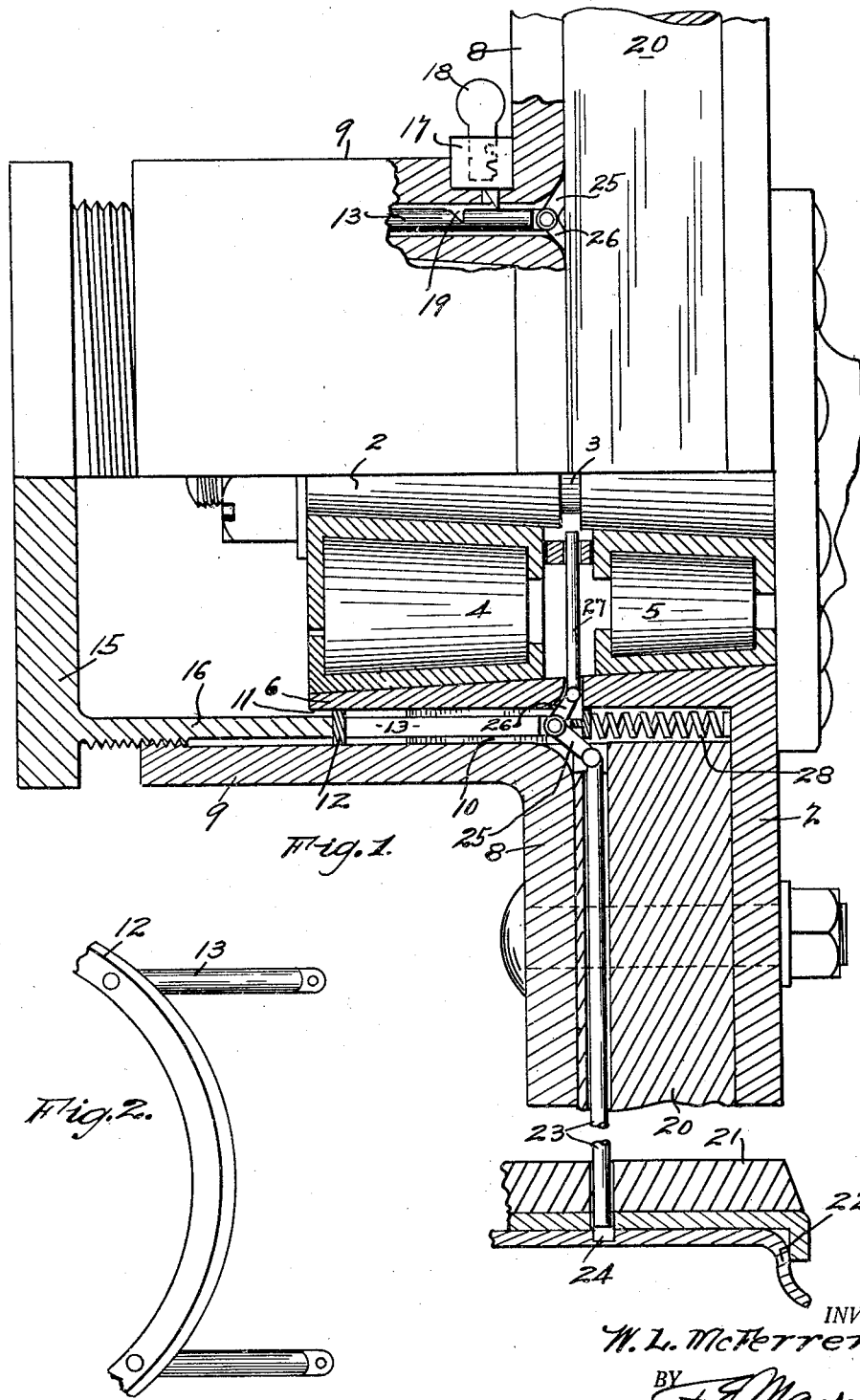
Figure 1 is an axial section and partial elevation of a wheel and hub incorporating the lock.
Figure 2 is a detail view of the ram-ring and its thrust rods.

In the illustrated adaptation a wheel spindle or axle 2 is provided with a peripheral groove 3 medially of its length.

On the spindle is a set of spaced roller bearings 4—5 which carry an inner hub sleeve 6 having an inner hub flange 7 bolted to an outer hub flange 8 whose sleeve 9 fits on the inner sleeve 6.

The sleeve 6 is longitudinally grooved at 10 and its end is turned off at 11 to receive a ring 12 to which is secured a set of thrust rods 13 which rest in the respective grooves 10.

A hub cap 15 has a barrel 16 which screws into the hub sleeve 9 and whose end is designed to engage and ram the ring 12 and force the rods 13 inward to such a position that they will be caught and locked by any appropriate lock device 17 in the hub structure 8 which is controlled by an opening key 18. The bolt of the lock here shown interlocks with a notch 19 in one rod 13.

The flanges 7 and 8 clamp tight on a set of spokes 20 of a felloe 21 having a demountable rim 22 carrying a tire which is to be guarded against unauthorized removal.

Through certain of the spokes extend radial pins 23 which enter keeper holes 24 in the mounted rim. The inner ends of the pins are connected to toggle links 25 which are pivotally attached to the rods 13.

Also attached to the rods 13 are inwardly directed short toggle links 26 which have radial bolts 27 arranged to enter the spindle groove 3.

The ram ring 12, its rods 13, the toggle links 25—26, the bolts 27 and the pins 23 are thus all connected as a unitary mechanism and this is forced in one direction by the applied cap barrel 16 to set the lock bolts 27 and lock pins 23 into effective position to lock the hub to the spindle and to lock the rim to the felloe all at one action.

When the hub cap is removed this removes setting pressure from the locking mechanism which is constantly under automatic opening exertion of a suitable spring instrumentality which, as here shown, includes a set of expansion springs 28 disposed to react against the ends of the thrust rods 13. But the locking mechanism cannot release until and unless the key controlled lock is opened to unlock the engaged thrust rod 13, and thereafter the releasing springs 28 take effect and pull the pins and bolts, and free the hub and the rim for dismounting.

What is claimed is:

1. A wheel having a felloe and a removable rim thereon, a spindle, on which the wheel is turnable, provided with a peripheral groove, a system of toggle-connected key pins mounted in the wheel parts to fasten the wheel to the spindle and the rim to the felloe against removal, a hub cap for the wheel, means connected to the pin toggles and engaged by the cap during its application to the wheel to actuate the pin system to set the pins, and a lock device engaging a part of and for fastening the system in set position.

2. A wheel having a felloe and a removable rim thereon, a spindle, on which the wheel is turnable, provided with a peripheral groove, a system of toggle-connected key pins mounted in the wheel parts to fasten the wheel to the spindle and the rim to the felloe against removal, a hub cap for the wheel, means connected to the pin toggles and engaged by the cap during its application to the wheel to actuate the pin system to set the pins, and a lock device engaging a part of and for fastening the system in set position; said pins effective to lock the wheel and rims irrespective of removal of the cap.

3. A wheel having a hub and a felloe and a removable rim on the felloe, a system of fastening elements to secure the rim on the felloe, a hub cap for the wheel hub, yieldable reciprocating means in the hub connected to said system and engaged by the hub cap during its application so as to set the fastening elements, and a lock device engaging a part of said means and effective to secure the same in locked position while the cap is dismounted.

4. A wheel having a hub, a spindle on which the wheel turns, a fastening device in the hub to retain the wheel against removal on the spindle and permitting free rotation, a hub cap, means engaged by the cap to set said device during and by application of the cap, and a lock for fastening the set device and effective to secure the same while the cap is dismounted.

5. A wheel having a hub and a cap therefor, and a fastening mechanism including a system of key pins engageable with a respective part to prevent relative separation, said system having a yieldable device disposed in the hub and which is engageable and operative by the cap during its application.

6. A wheel having a hub and a cap therefor, and a fastening mechanism including a system of key pins engageable with a respective part to prevent relative separation, said system having a yieldable device disposed in the hub and which is engageable and operative by the cap during its application, the device comprising a ring laterally shiftable by pressure axially of the cap and being connected to said system, and means engaging a part of said device to lock the same set.

7. A wheel and rim locking apparatus including a system of radial key pins to engage in the spindle of a wheel and a system of radial key pins to engage in the wheel felloe, a means combined with the systems of pins to effect their concurrent axial motion, and a device connected to the said means to motivate it and adapted for setting action by application of the wheel hub cap, a lock to engage the set device and hold the same should the cap be removed, and means to automatically retract the set parts when the lock is unfastened and the cap removed.

WILLARD L. McFERREN.